Sept. 7, 1965          H. B. CARR          3,204,483
ROTARY DRUM STRAINER AND DRIVING GEAR THEREFOR
Filed Aug. 12, 1963          3 Sheets-Sheet 1
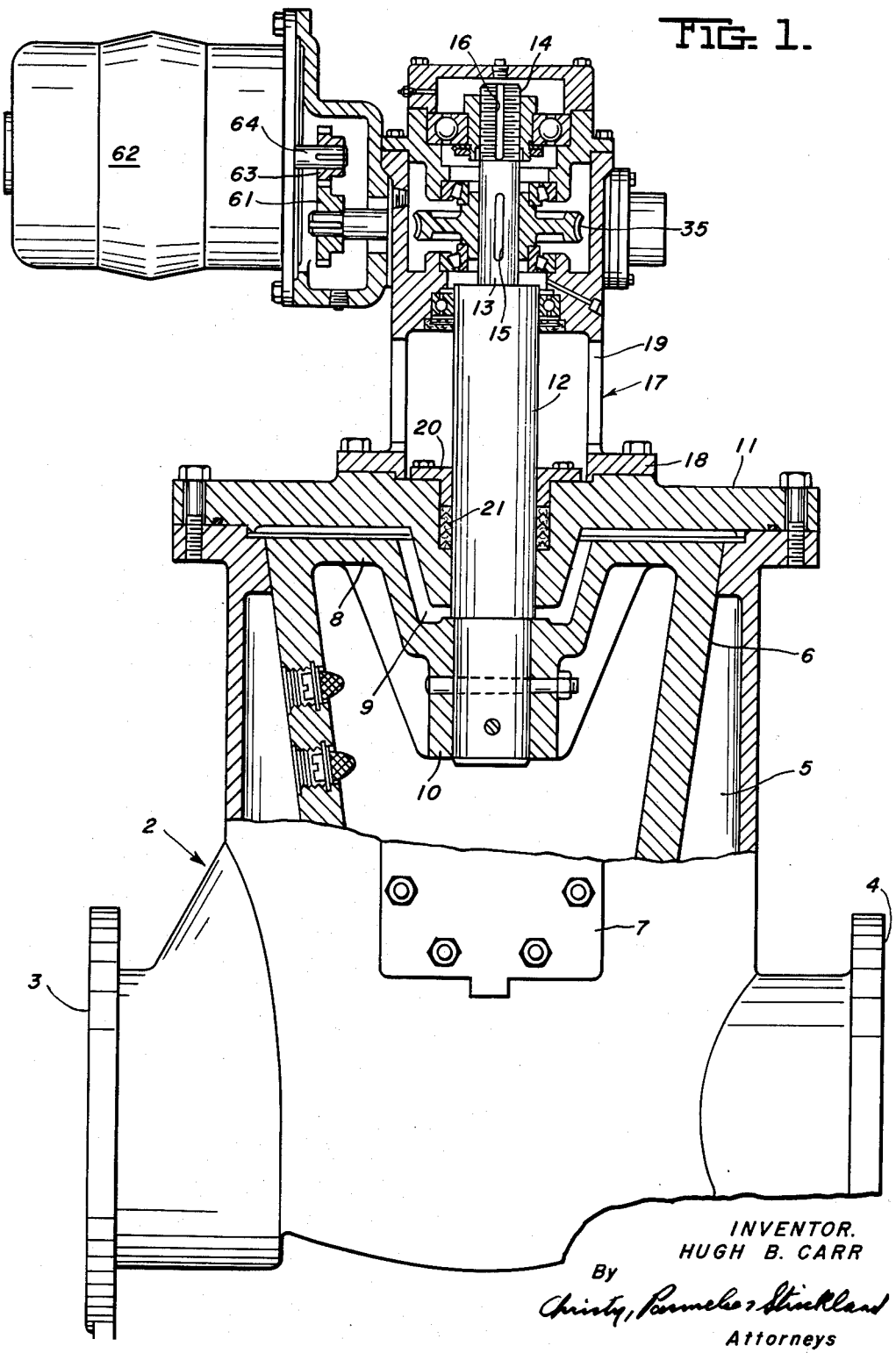
INVENTOR.
HUGH B. CARR
By Christy, Parmelee & Strickland
Attorneys

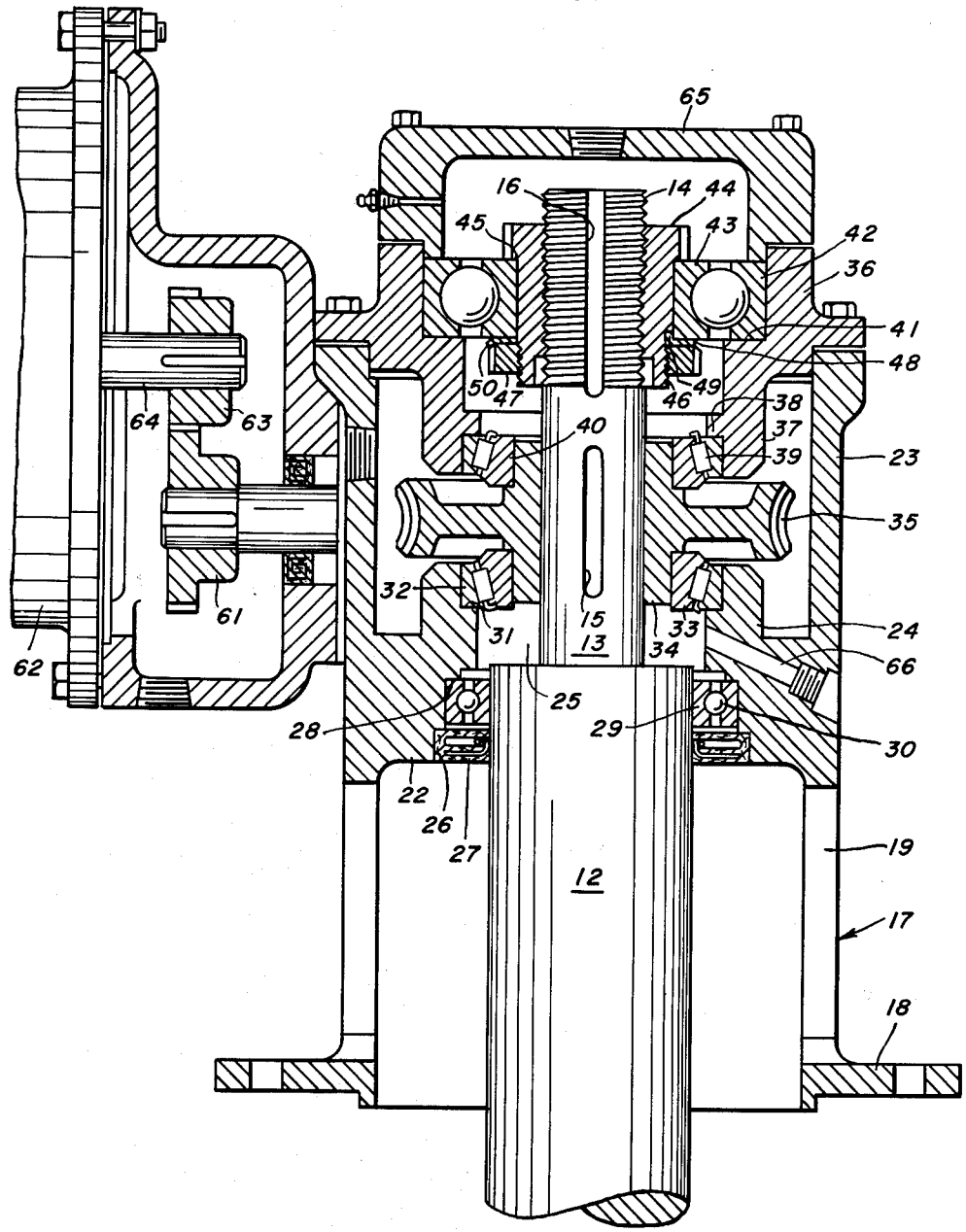

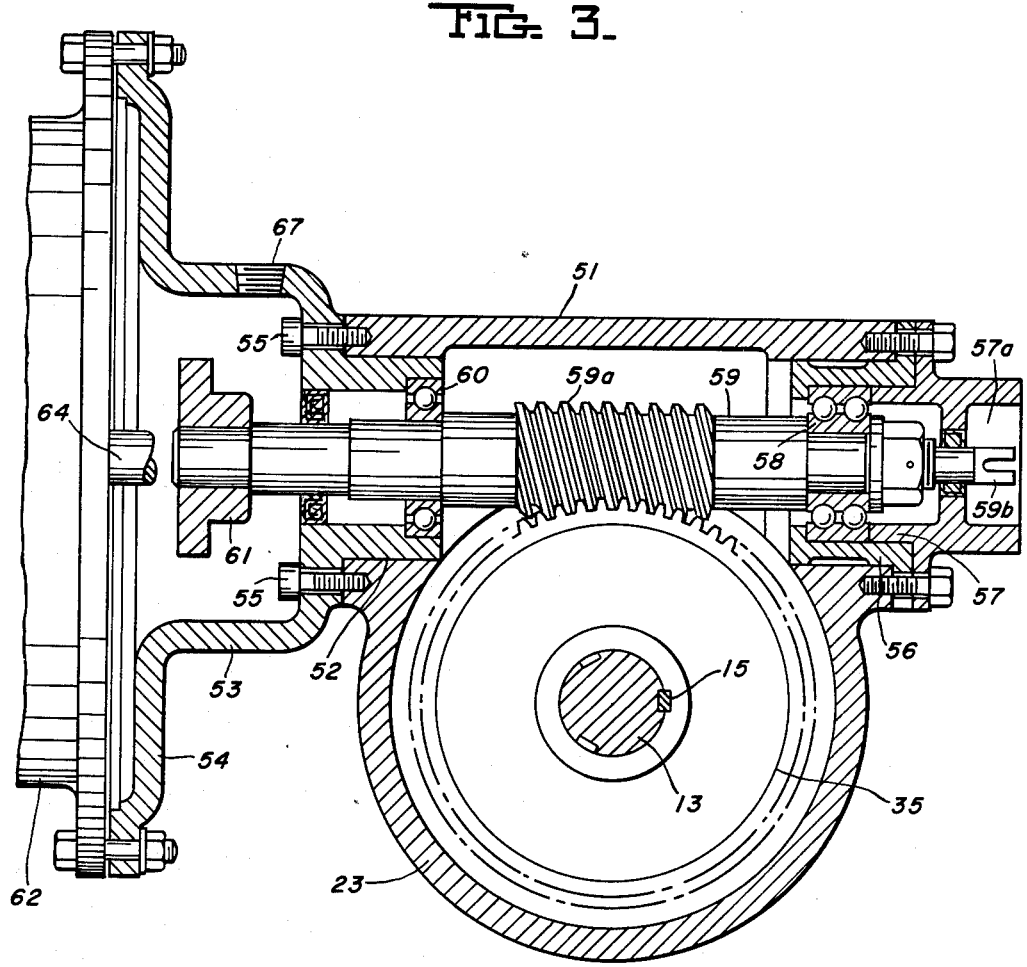

United States Patent Office 3,204,483
Patented Sept. 7, 1965

3,204,483
ROTARY DRUM STRAINER AND DRIVING
GEAR THEREFOR
Hugh B. Carr, Carnegie, Pa., assignor to S. P. Kinney Engineers, Inc., Carnegie, Pa., a corporation of Pennsylvania
Filed Aug. 12, 1963, Ser. No. 301,351
10 Claims. (Cl. 74—606)

This invention relates broadly to the art of rotary drum strainers used in industry, and particularly to a drive unit for rotating the drums of such strainers and providing a unique shaft bearing therefor.

Strainers of the rotary drum type are widely used in industry for the removal of solids such as leaves, organic matter and sand from surface water, or the removal of solids from industrial waste water and elsewhere. They comprise generally a housing having a vertical cylindrical chamber within which is a drum arranged to rotate about a vertical axis carried on a central shaft that projects upwardly through a cover for the housing. A motor drive is mounted on the cover for rotating the shaft. The arrangement is such that water to be strained is introduced into the chamber outside the drum, passes through strainer elements in the drum wall, and passes axially out the bottom of the drum into an outlet for the strained water. The top of the drum is closed. On the interior of the housing or casing is a backwash shoe that bears against the exterior of the drum through which some of the strained water or other liquid inside the drum will flow outwardly through the strainer elements as they move by rotation of the drum past the shoe, dislodging and flushing away solids that have been trapped in them. This is all well known in the art.

In all such strainers a thrust bearing is necessary to carry the weight of the revolving drum and shaft, and radial bearings are necessary for holding the shaft in position vertically. In larger capacity strainers the drum is generally in the form of an inverted truncated cone, and vertical adjustment of the drum is required to keep the surface of the drum in proper sliding contact with the face of the shoe which must have an inclination conforming to the downward slope of the drum.

In my copending application Serial No. 301,352, filed August 12, 1963, I have shown such a strainer with an adjustable thrust bearing at the upper end of the shaft for both raising and lowering the drum combined with a driving gear for rotating the shaft. The present invention is for an improved driving gear and shaft bearing and adjusting means especially useful with a strainer as therein disclosed, but adaptable to strainers of any form having a drive shaft projecting vertically through the top of the housing. It comprises an integrated unit which may be set in place and secured on the top cover of the strainer and can be removed as a unit for repair or replacement. It has a further advantage in that it need not be custom built for an individual strainer, but may be manufactured as a stock unit adaptable to a range of strainer sizes.

A principal object of the invention is to provide a driving and bearing assembly for rotating drum strainers which is of unique construction and in which all vertical adjustment of the drum may be made from the top of the strainer, eliminating need for a workman to get under the strainer to adjust a thrust bearing at the bottom of the shaft. A further object is to provide a drive unit in which all thrust and radial bearings for the drum shaft are contained.

The invention may be more fully understood by reference to the accompanying drawings showing an embodiment thereof, and in which:

FIG. 1 is a view partly in side elevation and partly in vertical section showing a strainer with the drive unit mounted thereon;

FIG. 2 is a vertical section on a larger scale through the drive unit apart from the strainer, with the drive motor broken away; and FIG. 3 is a horizontal section in approximately the plane of line III—III of FIG. 2.

Referring first to FIG. 1, 2 designates the body of a strainer having an inlet connection 3 and an outlet connection 4. The body 2 provides a generally cylindrical chamber 5 in which is a rotary drum 6 such as is commonly provided in structures of this kind, the drum being in the form of an inverted truncated cone so that it is circular in section, but of downwardly-diminishing diameter. Within the body of the strainer, but not shown in the drawings, is a backwash shoe such, for example, as disclosed in my copending application above referred to, and also shown in Kinney Patent No. 2,956,683 granted October 18, 1960. The drum is provided throughout substantially its entire wall area with openings in which are inserted the straining media or straining elements which are replaceable, and which are accessible for replacement through an access opening in the body of the strainer, this access opening being normally closed by a cover plate 7.

The top of the drum is closed by an inwardly-extending top wall 8 which is countersunk at the center as shown at 9, and at the bottom of the countersink there is a hub 10. The top of the strainer has a cover 11 removably bolted thereon.

According to the present invention a specially formed shaft 12 is secured to the hub 10 and extends upwardly through the cover. It has a reduced extension 13, the upper end of which is threaded at 14. The extension 13 is provided with one or more keyways 15, and there are one or more keyways or grooves 16 extending from the top end of the extension downwardly along the threaded portion 14. As here shown, the drum is bolted to the shaft 12 but other forms of connections such as that disclosed in my copending application may be provided.

The drive unit of the present invention comprises a pedestal 17 with a flange 18 at its base, the flange being adapted to set on and be bolted to the cover. The pedestal is concentric about the shaft and is of substantially larger diameter. It is provided with opposed arcuate openings 19 through which access may be had to a gland 20 in the cover around the shaft 12, this gland serving to confine a packing 21. The pedestal has a stop portion 22 that extends inwardly toward the shaft 12, but is spaced from the shaft. It has an upwardly-extending outer wall 23 forming a recessed enclosure in the top of the pedestal, and there is a concentric inner wall 24 that is spaced inwardly from the outer wall and of substantially less height.

The pedestal has a central passage or opening designated generally as 25 extending from top to bottom to enable the pedestal to be placed about the drum shaft. In this passageway there is an offset 26 to retain a grease seal 27. Above the grease seal there is a further offset 28 to receive a ball race 29 for a ball bearing assembly 30 which is adjacent the top part of the main shaft but below the reduced extension 13.

On the inner wall 24 there is a ledge or shoulder 31 for supporting a taper roller bearing assembly 32 with the roller bearings having their axes sloped upwardly and outwardly. An inner race 33 is fitted about the hub 34 of a worm gear wheel 35 that is supported on the bearing assembly 32, and the bearing assembly 32 constitutes a thrust bearing and radial bearing for supporting the worm gear wheel 35 at a fixed level in the pedestal.

Bolted to the top of the outer wall 23 of the pedestal is a part 36 which is here termed a bearing retainer. This retainer has a downwardly-projecting portion 37 that is concentric with, but spaced from, the extension 13 of the shaft. It has an inwardly-projecting ledge 38. There is a taper roller bearing assembly 39 within the lower end of this retainer seated against the ledge 38 and above the worm gear wheel 35. It has an inner race 40 which surrounds the upper part of the hub 34 of the drive gear wheel 35. It is a counterpart of bearing assembly 32 but reversed and constitutes a thrust bearing for confining the worm gear wheel against upward motion, so that the drive gear wheel is freely rotatable but is confined at a fixed level.

It will be seen from this arrangement that the worm gear wheel 35 is held in position by the bearing assemblies 32 and 39 so that it cannot move either upwardly or downwardly and remains in place whether the shaft extension 13 is engaged in the center of the worm wheel or whether it is removed.

The bearing retainer 36 also has a shoulder 41 on which is set a ball bearing assembly 42 that surrounds the upper threaded end of the portion 14 of the shaft extension 13. This assembly includes an inner ring or race 43. The ring 43 is fitted about a shaft-nut 44 that is screwed onto the threaded upper end 14 of the shaft extension, and which has a shoulder or thrust ring at 45 for confining the ball bearing ring 43 against relative upward movement on the nut. The lower end of this shaft-nut is externally threaded at 46 and there is a thrust ring in the form of a nut 47 screwed onto the exterior of the lower portion of the shaft nut 44. The periphery of the nut 47 is notched or castellated. There is a locking washer 48 between the nut 47 and the bearing ring 43, this washer having a lug 49 that projects radially inwardly into a recess in the exterior of the shaft-nut. It has an outwardly-extending lug or lugs 50 which is bent downwardly after the parts have been adjusted to engage in one of the notches or castellations in the periphery of the nut 47. In this way the lock washer keys the nut 47 to the shaft extension to prevent relative rotation of the parts after they have been adjusted.

The shaft-nut 44 may be adjusted on the shaft by turning it to raise or lower the shaft, and when the shaft is at the proper height to keep the drum in working relation to the shoe a gib key is driven into one of the keyways 16, the nut having a confronting keyway to receive the key. When the nut is thus keyed to the shaft it must rotate with the shaft.

The ball bearing assembly as thus constructed provides a thrust bearing to hold the strainer shaft in suspension and also resist upward thrust on the shaft. This bearing, in conjunction with the ball bearing assembly 30, also provides radial bearings for the strainer shaft, accepting all of the radial forces against the shaft and keeping it in vertical alignment.

At one side of the upper portion of the wall 23 of the pedestal there is a generally tangential cylindrical barrel portion 51 best seen in FIG. 3. A sleeve 52 is fitted into one end of this cylindrical casting and the sleeve has an outwardly-flared enlarged portion 53 forming a gear box beyond the sleeve, and the portion 53 in turn has an outwardly-extending flange 54 constituting a motor supporting flange. Bolts 55 secure the sleeve assembly 52, 53, 54 to the main body of the pedestal around the end of the cylindrical barrel portion 51. Fitted into the other end of the cylindrical portion 51 is a sleeve 56 and bearing against the sleeve 56 is an inner sleeve and end member 57 which serves to confine a ball bearing assembly 58 in the sleeve 56. This ball bearing assembly supports one end of a worm shaft 59 and there is a ball bearing assembly 60 for the other end of this worm shaft in the sleeve 52. The left end of the worm shaft 59 as viewed in FIG. 3 projects into the enlarged chamber portion or gear box 53 on the sleeve 52 and is provided with a pinion 61. There is a worm or helical gear 59a that meshes with the worm gear teeth on the periphery of the worm wheel 35 so that when the shaft 59 is rotated the worm wheel 35 will rotate to turn the strainer shaft and the drum which is carried by the shaft.

A driving motor 62 is bolted to the flange 54 and as best seen in FIG. 1 it has a pinion 63 on its shaft 64 within the gear box that meshes with the pinion 61 on the worm shaft. Preferably the pinion 63 is of slightly smaller diameter than the pinion 61 so as to get a slight speed reduction through this gearing.

The other end of the worm shaft 59 projects through the sleeve 57 into a socket 57a in the end member and it is squared as indicated at 59b to receive a wrench or crank for rotating the worm shaft by hand. It is important in initially adjusting the strainer drum in the casing, or in making subsequent adjustments, by raising or lowering the shaft 12 through the use of the shaft-nut 44 that the strainer can be turned by means of a hand crank or wrench until the parts are all in adjusted position and locked into place.

There is a cover 65 that is bolted on top of the bearing retainer 36. To make an adjustment of the strainer shaft after the strainer has been in use for a period of time the cover 65 can be readily removed to allow access to the gib key to permit its removal so that the nut 44 can be adjusted up or down as required. The rotation of the nut 44 on the threads at the upper end of the shaft gives practically a micrometer adjustment.

When the strainer is in use a plug in the cover 65 is removed and grease is injected through the cover to completely fill the space around the bearing assembly 42. An opening normally closed by a removable plug provides for the insertion of grease through the wall 23 into the area surrounding the worm wheel 35 and grease can be injected through a passage 66 into the space below the bearing 33. The grease ring 27 confines the lubricant in the area below the bearing 33. An opening which normally receives a plug is also provided at 67 to fill the chamber inside the end portion 53 so that the gears 61 and 63 are lubricated.

There is an advantage in having the lower roller bearing assembly 30 engage the main body of the shaft below the threaded extension and the diameter of the bearing 30 and the grease retainer 27 is such that the shaft can be entered vertically through the bearing and grease retainer. The entire structure, including the driving motor, the worm shaft, the worm wheel and the adjusting nut 44 with the bearing assemblies 42, 30, 32 and 39 can all be assembled separately from the strainer so that when it is necessary to provide a strainer with a driving gear the pedestal 17 is simply set in place over the projecting top end of the shaft 12 and bolted into place. A feather key is placed in the key way 15 as the upper end portion of the shaft enters the drive wheel 35 to slidably key the worm wheel to the shaft extension. At this time the shaft-nut 44, the cover 65, and the bearing assembly 42 are all removed, but after the pedestal has been bolted into place on the cover of the strainer, the shaft-nut with the adjusting nut 47 and the bearing assembly 42 are all installed into place and the shaft-nut 44 is adjusted vertically to suspend the strainer drum in proper position inside the casing. When this has been completed the cover 65 is bolted on. It will be seen that all of the bearings for the drum, including the thrust bearings, are contained in the pedestal and the parts carried thereby so that it is necessary to provide any thrust bearing at the bottom of the strainer or to provide legs on the strainer for elevating the body of the strainer or to provide legs on the strainer for elevating the body of the strainer above the body on which it sets. It will also be seen that the drive gear wheel, being slidably keyed to the drum shaft, is not subjected to thrust of the drum shaft or carry any part of the weight of the drum and its shaft.

While I have shown and described one embodiment of my invention it will be understood that various changes and modifications may be made in the detail construction and arrangement of parts within the contemplation of my invention and under the scope of the appended claims.

I claim:

1. A rotary strainer and drive unit therefor comprising a strainer having a housing and cover for the housing, a rotary strainer drum in the housing, a shaft from which the drum is suspended extending upwardly through the housing, a pedestal supported on the cover about the drive shaft, a drive gear wheel in the pedestal, the wheel having a hub portion, the hub having bearings thereabout fixed in the pedestal against vertical movement to hold the drive gear wheel at a fixed level in the pedestal, the hub having a shaft opening therethrough, the shaft having a keyway therein and a key connecting the shaft and gear against relative rotational movement but allowing vertical adjustment of the shaft relative to the drive gear wheel, the upper end of the shaft extending above the hub of the drive gear wheel and being threaded, a shaft nut on the threaded end of the shaft, a combined radial and thrust bearing carried by the pedestal in which the nut rotates, the nut and the bearing being interfitted against relative vertical movement, a removable key engaging the shaft nut and shaft holding the nut against relative rotation, the removal of said key enabling the nut to be turned in the bearing on the threaded end of the shaft for raising or lowering the drum.

2. A rotary strainer and drive unit therefor as defined in claim 1 in which the pedestal has a second radial bearing for the shaft at a level below the drive gear wheel.

3. A rotary strainer and drive unit therefor as defined in claim 1 in which the pedestal has a second radial bearing for the shaft at a level below the drive gear wheel, the drive gear wheel having worm-engaging gear teeth on its periphery, the pedestal having a generally cylindrical barrel formed thereon the axis of which extends tangentially to the drive gear wheel, a worm gear shaft in said barrel with a worm gear meshing with the teeth on said drive gear wheel, the barrel portion having bearings therein at each end of the worm, and driving means operatively connected with one end of said worm gear shaft.

4. A rotary strainer and drive unit therefor as defined in claim 1 in which the pedestal has a second radial bearing for the shaft at a level below the drive gear wheel, the drive gear wheel having worm-engaging gear teeth on its periphery, the pedestal having a generally cylindrical barrel formed thereon the axis of which extends tangentially to the drive gear wheel, a worm gear shaft in said barrel with a worm gear meshing with the teeth on said drive gear wheel, the barrel portion having bearings therein at each end of the worm, and driving means operatively connected with one end of said worm gear shaft, the other end of said worm gear shaft being accessible from the end of the barrel and having a portion to which a hand crank may be fitted for manually turning the worm in making the adjustment of the shaft nut with the drum shaft.

5. A drive gear and drum-shaft bearing unit for rotary drum strainers comprising a pedestal having a vertical opening therethrough, the pedestal having a recess in the top thereof, a shaft driving wheel in the recess having a shaft-engaging hub portion, a conical bearing in the pedestal below the driving wheel engaging the hub for rotatably supporting the wheel and resisting downward thrust thereon, a removable bearing retainer in the upper part of the pedestal in the recess concentric with said opening, a conical bearing in said retainer engaging the hub of said driving wheel for resisting upward thrust on said wheel whereby the wheel is rotatably supported at a fixed level in the pedestal, an internally threaded shaft nut in the upper part of the bearing retainer, a ball bearing assembly in the bearing retainer encircling the shaft nut and confined against vertical movement relative to the nut, a removable cover on the bearing retainer contacting the top of the ball bearing assembly for holding it against upward movement in the bearing retainer, the bearing retainer having a shoulder for holding said ball bearing assembly against downward movement whereby the ball bearing assembly constitutes a radial bearing for the shaft nut and a thrust bearing therefor.

6. A drive gear bearing unit for a rotary drum strainer having a housing with a cover and a drum shaft extending upwardly through the cover and having a threaded upper end, comprising a pedestal adapted to set on the cover and surround the shaft, a shaft nut supported in the pedestal adapted to be screwed onto the upper end of the shaft, a combined thrust and radial bearing in which said nut is fixed against relative vertical movement and in which it is rotatable, means carried by the pedestal confining the bearing against vertical movement in the pedestal, a drive gear wheel mounted in the pedestal below said shaft nut, said drive gear wheel having a hub adapted to be slidably keyed to the shaft of the drum, bearings in the pedestal above and below the wheel engaging the hub for rotatably supporting it at a fixed level in the pedestal, and a radial bearing fixed in the pedestal below the drive gear wheel and hub for guiding the drum shaft below the gear, the shaft nut having a keyway therein for receiving a key by which it may be non-rotatably fixed to the drum shaft.

7. A drive gear bearing unit for rotary drum strainers as defined in claim 6 wherein said combined thrust and radial bearing is confined in a removable bearing retainer set in the top of the pedestal and which bearing retainer is above the drive gear wheel and carries the bearing for the hub of the drive wheel which is above the plane of the drive wheel whereby in applying the drive unit to a strainer the drive gear wheel may be slidably keyed to the shaft before the shaft nut and its bearing are placed on the shaft and adjusted.

8. A drive gear bearing unit for rotary drum strainers as defined in claim 6 wherein said combined thrust and radial bearing is confined in a removable bearing retainer set in the top of the pedestal and which bearing retainer is above the drive gear wheel and carries the bearing for the hub of the drive wheel which is above the plane of the drive wheel whereby in applying the drive unit to a strainer the drive gear wheel may be slidably keyed to the shaft before the shaft nut and its bearing are placed on the shaft and adjusted, the drive gear wheel having worm teeth on its periphery, a barrel formed on the pedestal tangentially disposed with reference to the periphery of the drive gear wheel, a worm shaft received in the barrel having a driving worm meshing with the teeth on said wheel, bearings for the worm shaft in the barrel at each side of the worm, and driving means at one end of said shaft.

9. A drive gear unit for rotary drum strainers as defined in claim 6 wherein said combined thrust and radial bearing is confined in a removable bearing retainer set in the top of the pedestal and which bearing retainer is above the drive gear wheel and carries the bearing for the hub of the drive wheel which is above the plane of the drive wheel whereby in applying the drive unit to a strainer the drive gear wheel may be slidably keyed to the shaft before the shaft nut and its bearing are placed on the shaft and adjusted, the drive gear wheel having worm teeth on its periphery, a barrel formed on the pedestal tangentially disposed with reference to the periphery of the drive gear wheel, a worm shaft received in the barrel having a driving worm meshing with the teeth on said wheel, bearings for the worm shaft in the barrel at each side of the worm, and driving means at one end of said shaft, said barrel having a flange at one end with a gear box at the center of the plate, a motor secured to the flange having a shaft with a pinion thereon within the gear box, said driving means for the shaft comprising a gear on the worm shart also received in the gear box meshed with said motor pinion.

10. For use with strainer of the rotary drum type having a housing with a cover, a strainer drum in the housing, a shaft from which the drum is suspended projecting upwardly through the cover, the upper end of said shaft being threaded, the invention comprising a drive gear and bearing unit, said unit having a pedestal adapted to set on the cover of the strainer concentric about the shaft, a drive gear wheel supported in bearings in the pedestal to which the shaft may be slidably keyed, a combined thrust and radial bearing assembly in the pedestal above said drive gear wheel, an internally threaded shaft nut rotatably fixed in said thrust and radial bearing assembly at a fixed level above the drive gear wheel into which the threaded end of the said shaft is screwed for effecting vertical adjustment of the shaft relative to the nut and thrust and radial bearing assembly, said nut having a keyway therein by which it may be releasably keyed to the shaft when the shaft has been adjusted in the nut, said nut and thrust and radial bearing assembly being accessible at the top of the pedestal, and means on the pedestal for rotating the drive gear wheel.

No references cited.

DON A. WAITE, *Primary Examiner.*